Patented Aug. 13, 1946

2,405,784

UNITED STATES PATENT OFFICE 2,405,784

DERIVATIVES OF CHLORMETHYL ETHERS OF POLYOXYETHYLENE GLYCOLS AND PROCESS OF PRODUCING SAME

Daniel Geltner, Astoria, N. Y., assignor to Onyx Oil & Chemical Company, a corporation of Delaware No Drawing. Application April 24, 1942, Serial No. 440,397

9 Claims. (Cl. 260—404)

This invention relates to a process for the production of new glycol derivatives which are useful as wetting, penetrating, emulsifying and foaming agents, as detergents, as textile assistants, etc. The invention includes not only this new process, but new products which are advantageously produced by it.

The new products of the invention may be represented by the general formulae:

(1) $RXCH_2OZOH$ and (2) $RXCH_2OZOCH_2XR$ in which R represents a long carbon-linked chain or other hydrophobe radical, usually having 6 to 20 carbon atoms and corresponding to the carbon-linked chain of a fatty acid, or the hydrophobe radical of a resin, naphthenic or alicyclic acid, X represents the residue of a group having a reactive hydrogen atom, and Z represents a polyoxyethylene group which may contain as little as two ethylene groups or which may contain a very large number of ethylene groups so that it has a molecular weight, for example, of 3000 or more. These new compounds may be regarded as derivatives of monomethyl or dimethyl ethers of polyoxyethylene glycols in which one of the hydrogen atoms of the methyl group, or groups, is replaced by a functional radical having a large hydrocarbon or other hydrophobe group linked to a functional group such as an ether oxygen, an amino group, an alkyl amide group, a sulfur atom, a carboxyl group, a thiocarboxyl group, the residue of a polyhydroxy alcohol, or the like.

The new compounds are readily prepared by reacting a di-chlormethyl ether of a polyoxyethylene glycol with an equi-molar proportion of a higher alcohol, a higher acyl amide, an amine, an alkoxy acyl amide, a higher mercaptan, a higher fatty, naphthenic or resin acid, a monoglyceride or diglyceride, a thio acid, or the like, and this invention includes this advantageous process of producing the new products. When the di-chlormethyl ether of the polyoxyethylene glycol and the compound with which it is reacted are used in equi-molar proportions, but one of the chlorine atoms is replaced, and the resulting product, on treatment with water, splits off formaldehyde and hydrochloric acid to give unsymmetrical products of the type illustrated by Formula 1 above. Where the di-chlormethyl ether and the product with the replaceable hydrogen are reacted in the molar proportions of 1 to 2, both chlorine atoms are replaced, and symmetrical products of the type illustrated by Formula 2 above are obtained. The compounds may be represented by the formula $$RXCH_2OZOY$$

in which R, X and Z have the significance stated above and Y represents hydrogen or a radical represented by $RXCH_2$.

The di-chlormethyl ethers of the polyoxyethylene glycols are conveniently prepared by treating a polyoxyethylene glycol with formaldehyde or one of its polymers, usually paraformaldehyde and dry hydrogen chloride. This reaction is usually carried out at around 5° C., and after it has been completed, it is well to treat the reaction product with calcium chloride or other desiccant to remove any water formed.

The reactions involved in producing the new products of the invention, like most organic reactions, do not necessarily go to completion and are accompanied by side reactions to some extent, so that the final products produced are ordinarily mixtures of the desired product with products of side reactions, etc. The products, however, as produced are ordinarily suitable for use, and purification is seldom required. Also, it is not necessary to use pure materials as the reactants, and, indeed, mixtures of starting materials, such as mixtures of a higher alcohol with a higher acyl amide or acyl-amido-alcohol may be used in preparing mixed products. As a matter of fact, the polyoxyethylene glycols used in preparing new products are seldom purified products, particularly where the relatively high molecular weight products are involved. Thus these materials are ordinarily prepared by polymerizing ethylene oxide in the presence of water or by treating ethylene or diethylene glycol with ethylene oxide, and then subjecting the resulting product to distillation. The resulting separation is not sharp and any particular product, for example, nonaethylene glycol, will usually contain proportions of both higher and lower glycols. The still more highly polymerized products, such as those sold as Carbowax 1540 and Carbowax 3000, are probably still more complex mixtures of products of varying degrees of polymerization.

Among the materials which may be reacted with the chlormethyl ethers of polyoxyethylene glycols in accordance with the process of this invention to produce new products are:

1. The higher alcohols, such as lauryl, cetyl, stearyl and oleyl, the alcohols obtained by the hydrogenation of naphthenic acids or phenols, such as the alkyl naphthols, having 6 to 20 carbon atoms.

2. The higher carboxylic acids, such as lauric, palmitic, stearic and oleic acid, naphthenic acids, resin acids, talloil acids, and the like, having 6 to 20 carbon atoms.

3. Acyl amides of higher carboxy acids, such as stearamide, oleylamide, lauramide and the amides derived from other high molecular weight carboxy acids such as those referred to in paragraph 2.

4. The higher mercaptans, including those corresponding to the alcohols referred to in paragraph 1.

5. The acyl-amido-alcohols, such as hydroxyethyl stearamide, hydroxyethyl lauramide, and other acyl-amido-alcohols corresponding to the various carboxy acids referred to in paragraph 2.

6. Thio-acids, that is, acids such as those referred to in paragraph 2 in which one of the carboxy oxygens is replaced by sulfur.

7. Ethers or esters of polyhydroxy compounds, such as the higher fatty acid mono- or di-glycerides, such as glycerine monolaurate, glycerine dioleate, glycerine mono-stearate, similar derivatives of ethylene or diethylene glycol including such compounds as diethylene glycol mono-laurate, and ethylene glycol monostearate, ester anhydrides of the sugar alcohols such as mannitan monostearate and sorbitan monolaurate or other esters of carboxy acids with polyhydroxy alcohols having at least one residual replaceable hydrogen atom, and corresponding ethers obtained from the polyhydroxy alcohols and the higher alcohols.

8. The higher amines, that is, amines in which one of the hydrogen atoms of ammonia is replaced by a higher hydrocarbon group, such as lauryl amine, stearyl amine, oleyl amine, and the amines resulting from the hydrogenation of amides of other higher carboxylic acids, such as those referred to in paragraph 2, as well as the higher molecular alicyclic amines and the like, having 6 to 20 carbon atoms.

The invention will be illustrated by the following examples, but it is not limited thereto.

*Example 1.*—41.4 parts of nonaethylene glycol were dissolved in 80 parts of methylene dichloride and 6.5 parts of paraformaldehyde were added. Dry hydrochloric acid gas was passed in for one and one half hours at 5° C. After this time all of the paraformaldehyde had disappeared and the clear solution was shaken separately with two parts of anhydrous calcium chloride while passing through a stream of dry nitrogen under partial vacuum at −10° C. to 0° C. The material thus obtained was filtered and allowed to come to room temperature. To this was added 36 parts of hydroxyethyl lauryl amide and this mixture was heated until the amide melted. The resulting product after heating a short time was completely dispersible in water and foamed and wetted excellently.

As the hydroxyethyl lauryl amide and the di-chlormethyl ether of the nonaethylene glycol were used in equi-molecular proportions, the final product, after treatment with water or when introduced into water, was the monoether represented by the formula

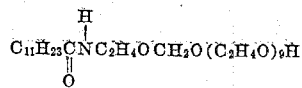

*Example 2.*—300 parts of Carbowax 3000 (a commercial polyoxyethylene glycol having an estimated molecular weight of 3000) was treated with 7 parts of paraformaldehyde and with dry hydrogen chloride as in Example 1, and the resulting product was treated with 27 parts of amide obtained by reacting coconut fatty acids with monoethanol amine. The resulting product was completely soluble in water and had excellent surface active properties.

*Example 3.*—154 parts of Carbowax 1540 (a commercial polyoxyethylene glycol having an estimated molecular weight of 1540) was converted to the di-chlormethyl ether by the procedure described in Example 1 and the resulting product was treated with 240 parts of cetyl alcohol. The condensation product had excellent emulsifying properties and was an effective wetting and foaming agent.

*Example 4.*—The di-chlormethyl ether of nonaethylene glycol, prepared as in Example 1, was reacted with the condensation product of spermaceti and monoethanol amine. The resulting product was a mixture of the condensation product of the di-chlormethyl ether of nonaethylene glycol with cetyl alcohol and the condensation product of the same ether with hydroxyethyl palmitic amide, represented by the formulae:

and

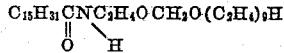

This mixed product was completely dispersible in water and had very good emulsifying, wetting and foaming properties.

*Example 5.*—The product of reaction of nonaethylene glycol, paraformaldehyde, and hydrochloric acid gas as described in Example 1 was reacted with glycerol monolaurate in equi-molecular proportions. The resulting product showed excellent emulsifying properties.

*Example 6.*—The product of reaction of nonaethylene glycol, paraformaldehyde and hydrochloric acid gas as described in Example 1 was reacted with an equi-molecular part of mannitan monopalmitate. The resulting product was soluble in water and had good emulsifying properties.

The new products of the invention may be treated with a sulfonating or sulfating agent such as concentrated sulfuric acid, oleum or chlorsulfonic acid to produce products having increased hydrophilic properties which are more readily dispersible or soluble in water. In general, where sulfonation is not used, the dispersibility or solubility of the new compositions in water will vary inversely with the size of the hydrocarbon group and directly with the size of the polyoxyethylene radical.

I claim:

1. The process of preparing compositions useful as wetting, dispersing, foaming, emulsifying and cleansing agents which comprises condensing a chloromethyl ether of a polyoxyethylene glycol with a compound having (1) a hydrocarbon radical with 6 to 20 carbon atoms and (2) a functional group having a replaceable hydrogen atom.

2. The process of preparing compositions useful as wetting, dispersing, foaming, emulsifying and cleansing agents which comprises condensing a chlormethyl ether of a polyoxyethlene glycol with a higher acyl amide.

3. The process of preparing compositions useful as wetting, dispersing, foaming, emulsifying and cleansing agents which comprises condensing a chlormethyl ether of a polyoxyethylene glycol with a higher acyl-amido-alcohol.

4. The process of preparing compositions useful as wetting, dispersing, foaming, emulsifying and cleansing agents which comprises condensing a chlormethyl ether of a polyoxyethylene glycol with a higher amine.

5. The process as in claim 1, in which the hydrophobe group of the second reactant is a carbon-linked aliphatic hydrocarbon group having 6 to 20 carbon atoms.

6. Compositions of the formula:

$$RXCH_2OZOY$$

in which R is a group having a hydrocarbon radical with 6 to 20 carbon atoms, X is a functional radical, Z represents a polyoxy ethylene radical and Y represents a radical selected from the group of hydrogen and the radicals represented by $RXCH_2$.

7. Compositions of the formula:

$$RCONR'OCH_2OZOH$$

in which R is a hydrocarbon radical having at least 6 carbon atoms, R' is a lower alkylene group and Z is a polyoxyethylene radical.

8. Compositions of the formula:

$$RCONHCH_2OZOH$$

in which R is a hydrocarbon radical having at least 6 carbon atoms and Z is a polyoxyethylene radical.

9. Compositions as in claim 8 in which RCO represents the acyl radical of a higher fatty acid.

DANIEL GELTNER.